US012807777B2

(12) United States Patent
Borowiak, Jr. et al.

(10) Patent No.: US 12,807,777 B2
(45) **Date of Patent: *Nov. 24, 2026**

(54) METHOD OF MAKING AN ACID NEUTRALIZING POLYMER THROUGH REACTIVE COMPOUNDING

(71) Applicant: Workers First LLC, Pittsburgh, PA (US)

(72) Inventors: Matthew James Borowiak, Jr., Buffalo, NY (US); Richard Earl Partch, Hannawa Falls, NY (US); Kenneth Russell, Dacula, GA (US); David Geraint Roberts, Sheboygan Falls, WI (US)

(73) Assignee: Workers First LLC, Pittsburgh, PA (US)

( * ) Notice: Subject to any disclaimer, the term of this patent is extended or adjusted under 35 U.S.C. 154(b) by 630 days.

This patent is subject to a terminal disclaimer.

(21) Appl. No.: 18/447,705

(22) Filed: Aug. 10, 2023

(65) Prior Publication Data

US 2024/0182659 A1 Jun. 6, 2024

Related U.S. Application Data

(63) Continuation-in-part of application No. 17/692,856, filed on Mar. 11, 2022, now Pat. No. 12,024,593.

(60) Provisional application No. 63/397,462, filed on Aug. 12, 2022, provisional application No. 63/160,291, filed on Mar. 12, 2021.

(51) Int. Cl.

| | |
|---|---|
| ***C08J 7/12*** | (2006.01) |
| ***B29B 9/06*** | (2006.01) |
| ***B29B 13/10*** | (2006.01) |
| ***B29C 48/00*** | (2019.01) |
| ***B29C 48/05*** | (2019.01) |
| ***B29C 48/40*** | (2019.01) |
| ***B29K 77/00*** | (2006.01) |

(52) U.S. Cl.

CPC ............... *C08J 7/12* (2013.01); *B29C 48/022* (2019.02); *B29B 9/06* (2013.01); *B29B 13/10* (2013.01); *B29C 48/0022* (2019.02); *B29C 48/05* (2019.02); *B29C 48/40* (2019.02); *B29K 2077/00* (2013.01); *C08J 2377/02* (2013.01); *C08J 2377/04* (2013.01); *C08J 2377/06* (2013.01)

(58) Field of Classification Search

CPC .... C08G 69/48; D06M 13/325; D06M 13/33; D06M 13/463

See application file for complete search history.

(56) References Cited

U.S. PATENT DOCUMENTS

| | | | |
|---|---|---|---|
| 4,824,881 | A | 4/1989 | Kim |
| 5,310,824 | A | 5/1994 | Burch et al. |
| 8,709,466 | B2 | 4/2014 | Coady et al. |
| 11,078,331 | B2 | 8/2021 | Borowiak et al. |
| 2009/0163642 | A1 | 6/2009 | Kiss et al. |
| 2021/0324140 | A1 | 10/2021 | Borowiak, Jr. et al. |

FOREIGN PATENT DOCUMENTS

| | | |
|---|---|---|
| WO | 2022/192677 | 9/2022 |

OTHER PUBLICATIONS

Kuroda, et al.; "Non-aqueous, zwitterionic solvent as an alternative for dimethyl sulfoxide in the life sciences"; Communications Chemistry. Nov. 11, 2020. vol. 3, pp. 1-7; p. 1; Abstract.

Rodriquez, Karl, "International Search Report and Written Opinion"; mailed Jan. 9, 2024 for Application No. PCT/US/23/72005; The International Searching Authority / United States; Alexandria, Virginia.

Kim, Harry, "PCT International Search Report and Written Opinion of the International Searching Authority", PCT International Application No. PCT/US2022/019965 filed on Mar. 11, 2022, mailed on Jun. 9, 2022, United Statement Patent and Trademark Office, Alexandria, VA (6 pages).

Swar Sumita et al., Importance and Necessity of the Surface Modification of Nylon 6 Films for Future Biomedical Application, Nanocon, Oct. 21, 2016, retrieved on May 10, 2022 from: https://www.confer.cz/nanocon/2016/425-importance-and-necessity-of-the-surface-modification-of-nylon-6-films-for-future-biomedical-application, pp. 663-668.

Jia Xinqiao et al., Nylon Surface modification. Part 1. Targeting the amide groups for selective introduction of reactive functionalities, Polymer, vol. 47, Issue 14, Jun. 28, 2006, retrieved on May 11, 2022 from: https://www.sciencedirect.com/science/article/abs/pii/S0032386106006355, abstract, 4 pages.

(Continued)

*Primary Examiner* — Brieann R Johnston

(74) *Attorney, Agent, or Firm* — Dennis B. Danella, Esq.; Woods Oviatt Gilman LLP

(57) ABSTRACT

A method of making an acid neutralizing polymer material includes preparing a first reaction mixture including a buffering agent and an amine salt of either a halogenated tertiary amine or a haloalkyl heterocyclic aromatic amine. The first reaction mixture is added to a first compounding machine and reacted for a time and at a temperature sufficient to produce a neutralized amine. A second reaction mixture including a polyamide material and a strong base is prepared, added to the first reaction product and reacted for a time and at a temperature sufficient to produce the acid neutralizing polymer material. Alternatively, the buffering agent, amine salt of either a halogenated tertiary amine or a haloalkyl heterocyclic aromatic amine, and the polyamide material may be added and reacted for a time and at a temperature sufficient to produce the acid neutralizing polymer material.

17 Claims, 5 Drawing Sheets

(56) References Cited

OTHER PUBLICATIONS

Johnston, Brieann R., "Non-Final Office Action", U.S. Appl. No. 17/692,856, filed Mar. 11, 2022, dated Sep. 11, 2023, United Statement Patent and Trademark Office, Alexandria, VA (19 pages).

METHOD OF MAKING AN ACID NEUTRALIZING POLYMER THROUGH REACTIVE COMPOUNDING

CROSS REFERENCE TO RELATED APPLICATIONS

This application is a continuation-in-part of U.S. patent application Ser. No. 17/692,856 filed Mar. 11, 2022, which claims the benefit of U.S. Patent Application No. 63/160,291 filed Mar. 12, 2021, the contents of which are hereby incorporated by reference in their entirety. This application also claims the benefit of U.S. Provisional Application No. 63/397,462 filed Aug. 12, 2022, the contents of which is hereby incorporated by reference in its entirety.

STATEMENT REGARDING FEDERALLY SPONSORED RESEARCH OR DEVELOPMENT

This invention was made with government support under Award Number (FAIN) 2051796 awarded by the National Science Foundation (NSF). The government has certain rights in the invention.

TECHNICAL FIELD

The present invention relates to a method of making an acid neutralizing polymer, and more particularly to a method of making an acid neutralizing polymer using reactive compounding technology, and even more particularly to a method of making an acid neutralizing polymer through reactive extrusion.

BACKGROUND OF THE INVENTION

Polyamides, including nylon 6, nylon 6,6 (nylon 66) and nylon 12, are synthetic polymers amenable to functionalization through chemical modification of the amide groups within the polymer backbone. Nylon fabrics have been modified to increase their tensile strength for military application or modified to improve dye acceptance.

In U.S. Pat. No. 11,078,331, a process is described to create an acid neutralizing powder through a reaction in dimethyl formamide (DMF). This process has the disadvantage of providing only a low yield and hence the reacted product is limited in the extent to which it can provide the required acid neutralization properties. Additionally, the process by-products (butanol from the reaction and DMF vapor from the drying step) may be difficult to handle from an environmental perspective.

U.S. patent application Ser. No. 17/692,856 discloses an alternative process for producing acid neutralizing poly materials through reactive extrusion. While overcoming many of the drawbacks associated with the wet chemistry synthesis, the reactive extrusion system and method described within the ’856 Application may be improved upon, such as simplifying the reaction and eliminating potentially harmful or caustic reagents.

Thus, what is needed is an acid neutralizing polymer with high amide modification produced through a solvent-less method while also using less hazardous starting reagents and yielding more environmentally friendly and less hazardous waste materials. The present invention addresses this, as well as other, needs.

SUMMARY OF THE INVENTION

Acid Neutralizing Polymer Reaction (ANPR) is a method of creating an acid neutralizing polymer that can be used to generate both powder and resin in order to serve the Acid Proof Coatings & Lining market and Personal Protection Equipment (PPE) market. These powders can be added to floor coatings and also made into floor mats to protect equipment and personnel by neutralizing acids on contact.

Products manufactured with this technology exceed the performance of corrosion resistant materials such as PVC, PTFE, phenolic epoxy, and rubber floor mats through a combination of acidic corrosion resistance and acid neutralization. In addition, these polymers can be used to neutralize acids multiple times by refreshing them via a proprietary reactivation solution.

The technology involves reacting an amino nylon polymer, with additional chemicals within a polymer compounding process such as a twin-screw extruder, internal mixer (e.g., BANBURY), continuous mixer (e.g., FARREL Continuous Mixer) or a reciprocating single screw compounding machine (e.g., BUSS KO Kneader). The reaction involves the melt mixing of the ingredients using an optimized set of process conditions which provide the necessary temperature of reaction, residence time and degree of shear induced dispersion.

An advantage of the reactive compounding process is that it is possible to generate a much higher yield of the reacted final product. During the reactive compounding process, the reactions take place when the polymer is in the molten state and is undergoing intensive dynamic shear. This allows for intimate mixing of the reactants and optimal reaction yield by controlling temperature (which affects reaction rate) and residence time (which affects the extent of reaction).

In accordance with an aspect of the present invention, the reactive compounding can be accomplished in three steps. In the first step, amino nylon is blended with a halogenated-dimethylalkylamine such as 2-chloro-N,N-dimethylethylamine hydrochloride, an acid neutralizing compound such as calcium carbonate, and a heat stabilizer suitable for nylon such as BRUGGOLEN H10 available from L. Brüggemann Gmbh & Co. KG, Heilbronn, Germany. The first step of the reaction neutralizes the 2-chloro-N,N-dimethylethylamine hydrochloride. The second step involves reacting additional amino nylon with calcium hydroxide and a heat stabilizer suitable for nylon, the heat stabilizer may be the same or different than the heat stabilizer using in the first step. The second step generates anionic nitrogen atoms for reaction in the third step. The third step involves the combination of the reaction products generated in the first and second steps to produce the final product. Depending on the particular melt compounding process used, the final product can be produced in multiple steps or in either one or two steps.

In another aspect of the present invention, a method of making an acid neutralizing polymer material includes preparing a first reaction mixture comprising a buffering agent and an amine salt of either a halogenated tertiary amine or a haloalkyl heterocyclic aromatic amine. The first reaction mixture is added to a first compounding machine and reacted for a time and at a temperature sufficient to produce a neutralized amine. A second reaction mixture including a polyamide material and a strong base is prepared, added to the first reaction product and reacted for a time and at a temperature sufficient to produce the acid neutralizing polymer material. Alternatively, the buffering agent, amine salt of either a halogenated tertiary amine or a haloalkyl heterocyclic aromatic amine, and the polyamide material may be added and reacted for a time and at a temperature sufficient to produce the acid neutralizing polymer material.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION

Polyamides, such as but not limited to nylon 6, nylon 6,6 and nylon 12 may be modified through base-induced removal of the amido hydrogen to generate a reactive nitrogen atom within the polyamide backbone. In accordance with an aspect of the present invention, the nitrogen reacts with a basic compound, such as an amine, to covalently bond a basic pendant group to the polyamide chain. This basic pendant group is then free to neutralize any hydrogen ions which come into contact with the modified nylon.

Figure 1:
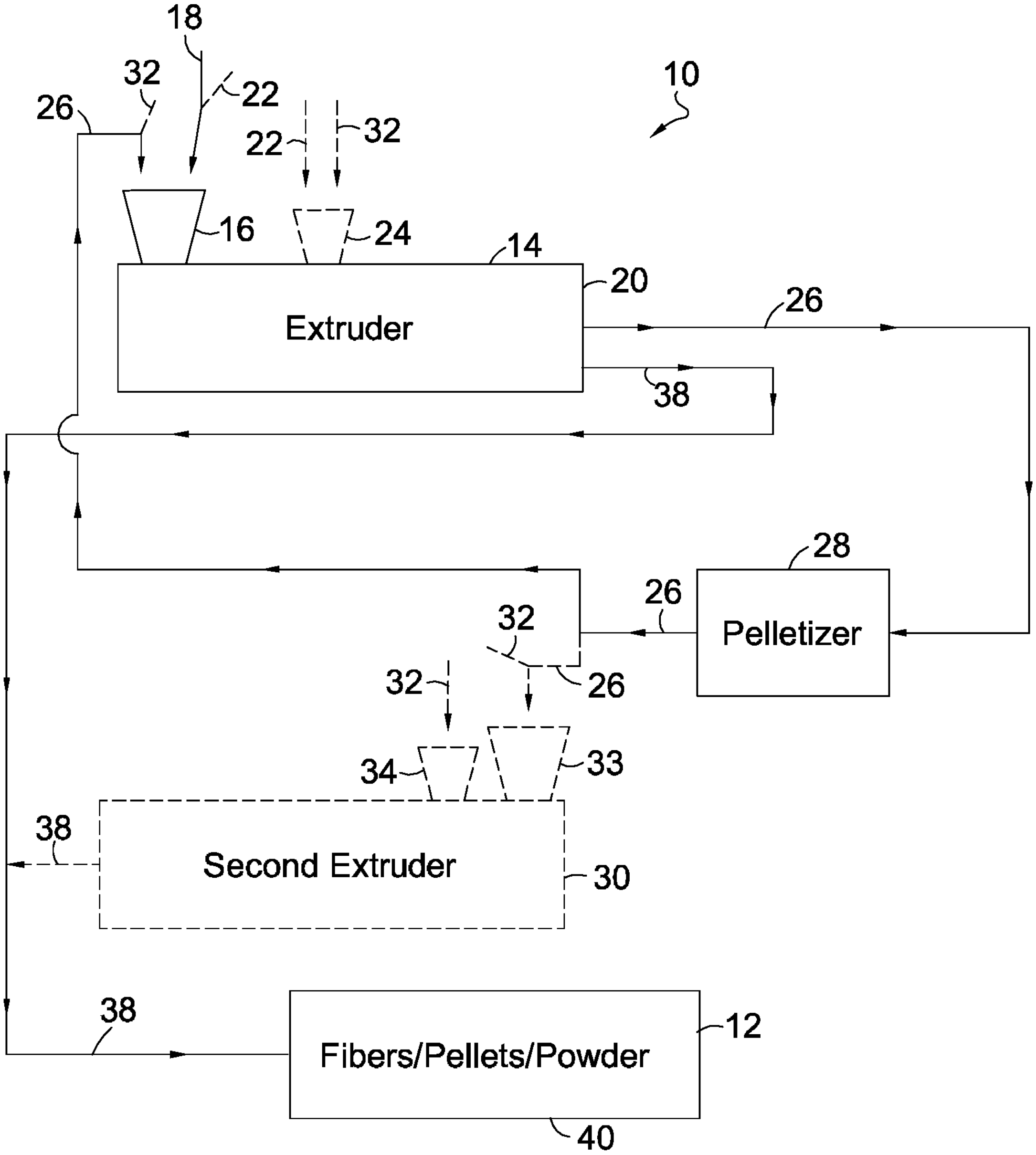
FIG. 1 is a schematic of an exemplary system for producing acid neutralizing polyamide in accordance with the present invention.

Turning now to FIG. 1, an exemplary system 10 for producing an acid neutralizing polymer end product 12 generally includes at least one compounding machine 14. In accordance with an aspect of the invention, the reaction can be realized in a suitable melt compounding process. Compounding machine 14 may include one or more of a twin-screw extruder, an internal mixer such as a BANBURY mixer or similar, a continuous mixer such as a FARREL Continuous Mixer or similar, or a reciprocating single screw compounding machine such as a BUSS KO Kneader or similar. In one exemplary embodiment, compounding machine 14 is a twin screw extruder. Twin-screw compounding has significant flexibility to vary temperature, residence time and order of addition of ingredients. Twin-screw compounding extruders are often modular in design and the machines can be configured to allow for addition of ingredients at different positions along the length of the barrel through entry points know as side feeding sections. Additionally, the screw designs can be easily configured to create specific functions along the length of the machine including sections for conveying, melting, mixing, reverse flow and pumping.

As seen in FIG. 1, compounding machine 14 includes at least one inlet hopper 16 configured to receive starting reagent virgin polyamide material 18 and feed the virgin polyamide material 18 into the rotating screw(s) (not shown) of compounding machine 14. In one aspect of the invention, virgin polyamide material 18 is a virgin polyamide material such as nylon 6, nylon 6,6 or nylon 12.

In accordance with a first exemplary embodiment, virgin polyamide material 18 may be blended with a solid, strongly basic material 22 (e.g., a basic salt of a strong base) within compounding machine 14. As used throughout this specification, a strong base shall mean any compound whose 1 Molar aqueous solution has a pH greater than about 12. In one aspect, basic material 22 may be added to virgin polyamide material 18 prior to loading of compounding machine 14. In another aspect, basic material 22 may be added after loading of virgin polyamide material 18, such as via a second inlet hopper 24. Basic material 22 may be any suitable material, and in accordance with the present invention may be potassium tert-butoxide (KOtBu).

The virgin polyamide material 18 and basic material 22 are then blended and heated within compounding machine 14 until melting and advanced toward an outlet end 20 of compounding machine 14 by action of the rotating screw(s). As the blended mixture of materials 18, 22 travels along the compounding machine, virgin polyamide material 18 becomes activated by removal of an amide hydrogen on the polyamide polymer backbone by the $tBuO^-$ anion. The time and temperature of the reaction may be optimized depending upon the amount of the starting reagents, size and flow rate of the compounding machine. An activated polyamide material 26 may then be passed into a size reduction machine, such as a pelletizer 28, where activated polyamide material 26 is reduced to any desired size, and in one aspect to between about 5 and about 300 microns.

In one exemplary embodiment, the pelletized activated polyamide material 26 is then reloaded into compounding machine 14, or optionally into a second compounding machine 30. The pelletized activated polyamide material 26 may then be blended with a halogenated-dimethylalkylamine 32 within compounding machine 14, 30. Halogenated-dimethylalkylamine 32 may be any suitable material, and in accordance with the present invention may have a general chemical formula of $(CH_3)_2N—R—X$. R may be an alkyl containing 1-12 carbon atoms while X may be either chlorine or bromine. In one particular aspect, the halogenated-dimethylalkylamine is 2-chloro-N,N-dimethylethylamine. In one aspect, halogenated-dimethylalkylamine 32 may be added to pelletized activated polyamide material 26 prior to loading of compounding machine 14, 30. In another aspect, halogenated-dimethylalkylamine 32 may be added after loading of pelletized activated polyamide material 26, such as via a second inlet hopper 24, 34.

Activated polyamide material 26 and halogenated-dimethylalkylamine 32 are then blended and heated within the respective compounding machine 14, 30 until melting and advanced toward outlet end 20, 36 of compounding machine 14, 30 by action of the rotating screw(s). As the blended mixture of materials 26, 32 travels along the compounding machine, the activated polyamide material 26 becomes functionalized by the dimethylalkylamine to produce an acid neutralizing polyamide 38.

Acid neutralizing polyamide 38 may then be further processed via a size reduction machine 40, such as forming acid neutralizing polyamide 38 into fibers for weaving into fabric material, pelletizing acid neutralizing polyamide 38 for mixing with other polymers or grinding or pulverizing acid neutralizing polyamide 38, such as via a cryogrinder, into a powder to serve as an additive.

Figure 2:
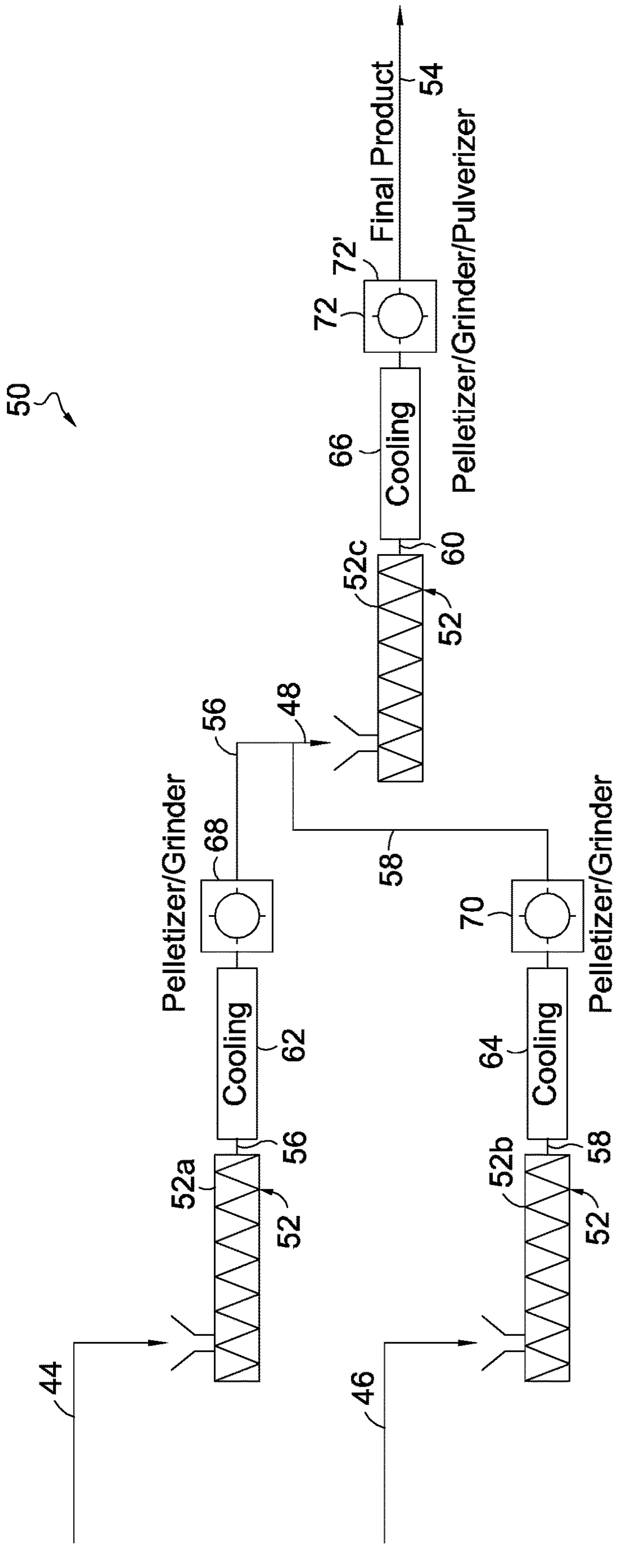
FIG. 2 is a schematic of an alternative exemplary system for producing acid neutralizing polyamide in accordance with the present invention.

With reference to FIG. 2, in an alternative embodiment of the present invention, a first reaction product 56 is produced by blending a first set of compounds 44 including amino nylon with a halogenated-dimethylalkylamine, such as but not limited to 2-chloro-N,N-dimethylethylamine hydrochloride, an acid neutralizing compound such as calcium carbonate and a heat stabilizing agent, such as but not limited to BRUGGOLEN H10 available from L. Brüggemann GmbH & Co. KG, Heilbronn, Germany, as shown in Reaction 1 set forth below. The calcium carbonate neutralizes (deprotonates) the protonated tertiary amine of the 2-chloro-N,N-dimethylethylamine hydrochloride.

Reaction 1

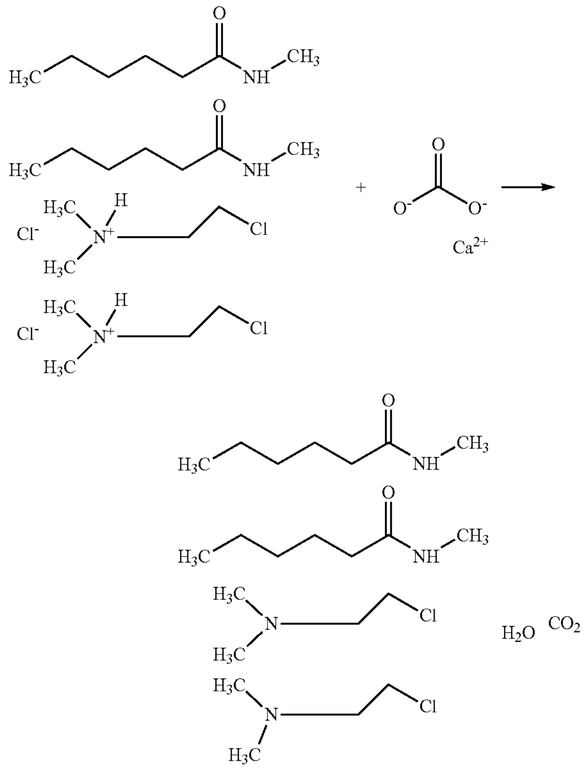

A second reaction product 58 is produced by blending a second set of compounds 46 including additional amino nylon with a strong base (pH>12), such as calcium hydroxide, and a heat stabilizing agent, such as but not limited to BRUGGOLEN H10 available from L. Brüggemann GmbH & Co. KG, Heilbronn, Germany as shown in Reaction 2 as set forth below. The hydroxide ions deprotonate the amide to generate a reactive nitrogen site on the nylon backbone.

Reaction 2

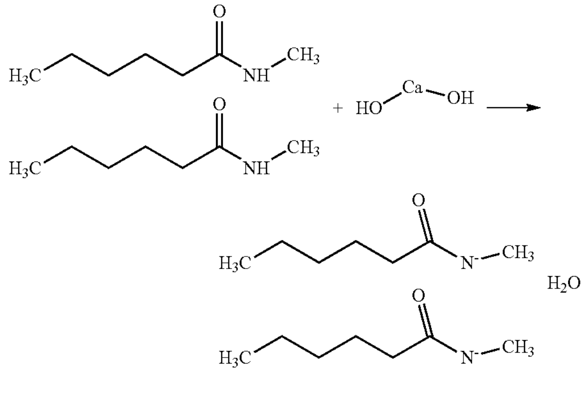

The acid neutralizing polymer product 54 is then prepared by reacting a third set of compounds 48 including the first reaction product 56 with the second reaction product 58 as shown in Reaction 3 set forth below.

Reaction 3

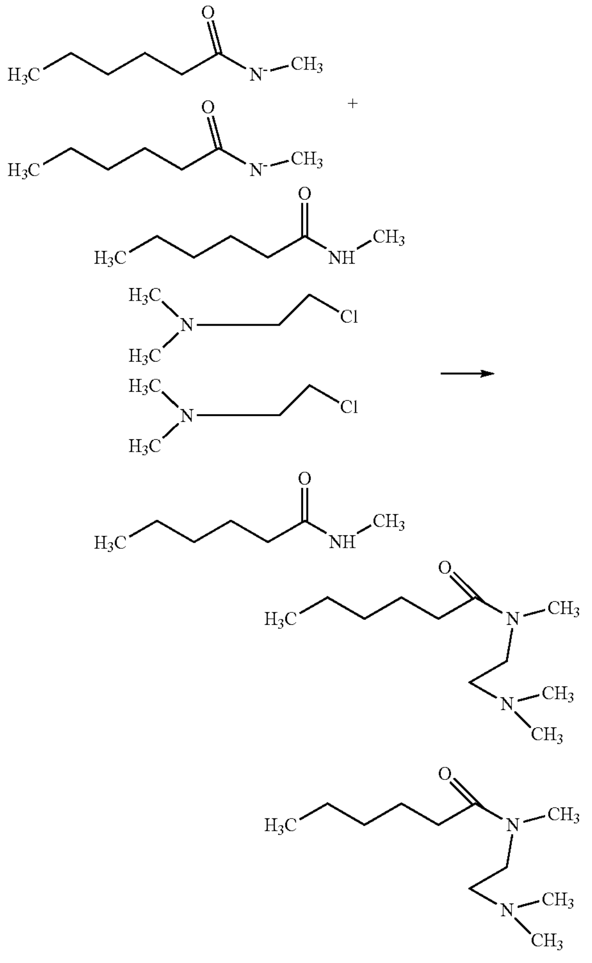

In one exemplary embodiment, the first and second reaction products 56, 58 each comprise a 50% molar fraction of the final product. As can been seen in Reactions 1-3, these process steps allow for less harmful wastes to be produced as the only byproducts are water and carbon dioxide. In addition, as calcium hydroxide is a polyprotic hydroxide base, less starting material is required which further reduces the environmental impact.

As shown in FIG. 2, a 3-pass manufacturing process 50 may use anywhere from 1 to 3 separate compounding machines 52*a*, 52*b*, 52*c* (generally compounding machine 52) in order to incorporate each reaction product to produce a final acid neutralizing polymer material 54. While any suitable reaction vessel may be used, in one exemplary embodiment, a twin screw extruder is used. As previously mentioned, the reaction can be realized in a suitable melt compounding process. One example is the method of twin-screw compounding as the process has significant flexibility to vary temperature, residence time and order of addition of ingredients. Twin screw extruders may be favorable reaction vessels as they melt the plastic, in this case, nylon, so that all the ingredients in this process can be reacted thoroughly. Reactive extrusion allows for the reaction to take place with the molten plastic acting as the solvent. The most important components in the extrusion process are heat, pressure, and the shear induced dispersion of the ingredients via the extruder, which in the exemplary embodiment described herein, is the twin screw. Without limiting thereto, twin screws may be favored for reactive extrusion because of their intimate shear induced dispersion.

In an exemplary embodiment described herein, the temperature of the compounding machine 52 must be maintained between about 194 degrees Celsius to about 205 degrees Celsius. In addition, the screw speed must be maintained at no less than about 100 rpms in order to keep material moving throughout compounding machine 52. To ventilate the off-gas produced by the production process 50, at least one vent (not shown) is located on compounding machine 52 and may be set up with proper vacuum ventilation. Once each respective reaction product 56, 58, 60 is produced, each product 56, 58, 60 may be respectively cooled 62, 64, 66, such as by using, without limitation thereto, air or water. If air cooling is utilized, a conveyer belt (not shown) may be necessary.

In one aspect of the present invention, one or more cooling processes 62, 64, 66 may additionally or alternatively include passing each reaction product 56, 58, 60 through a basic buffer solution bath (such as but not limited to a solution pH of about 10) prior to size reduction, such as through respective size reduction machines 68, 70, 72 (e.g., pelletizing machines). In one exemplary embodiment, manufacturing process 50 produces respective reaction products 56, 58, 60 in the form of pellets having a mean particle size between about 2 and about 8 millimeters or chopped strands depending on the configuration of respective size reduction machines 68, 70, 72 at the end of each respective process step. Furthermore, by alternatively or additionally feeding final reaction product 60 into a pulverizing machine 72', acid neutralizing polymer product 54 can be size reduced into a micron scale powder which is useful for certain final article production processes. It should also be understood by those skilled in the art that other end product forms may also be produced as desired.

In reactive extrusion, it is important to determine the molar fraction of each starting reagent necessary to achieve the best results. Experiments 1 to 6 below, different molar concentrations of reagents to be used in the full-scale process, from 10% to a maximum of 50%, were first evaluated using a small scale laboratory compounding machine. The CW BRABENDER prep mixer is a laboratory scale batch mixer where the melt mixing function is accomplished by two rotors within a closed mixing chamber. This technique allows for the temperature to be set, the residence time to be varied and the shear to be varied using a combination of a variable RPM and mixer chamber fill factor. This laboratory scale process was selected because it is a convenient method of carrying out multiple experiments and is capable of generating the key data required for the later transfer of the process to a larger scale device.

EXPERIMENTAL PROCEDURE

1. Set CW BRABENDER mixer temperature to 195 degrees Celsius and screw speed to 100 rpms.
2. Prepare reaction mixture 1 including nylon, heat stabilizing agent, 2-chloro-N,N-dimethylethylamine hydrochloride and calcium carbonate.
3. Gradually feed reaction mixture 1 into the CW BRABENDER mixer gradually. Pause periodically to push the mixture in with a push pin.
4. Grind reaction mixture 1 for a residence time of 3 minutes.
5. Turn the screw speed to zero and remove reaction product 1 from the CW BRABENDER mixer while the mixer is still hot.
6. Place reaction product 1 into a clean and dry vessel.
7. Clean the CW BRABENDER mixer of all excess material and reset the CW BRABENDER mixer screw speed to 100 rpms.
8. Prepare reaction mixture 2 including nylon, heat stabilizing agent and calcium hydroxide.
9. Gradually feed reaction mixture 2 into the CW BRABENDER mixer gradually. Pause periodically to push the mixture in with a push pin.
10. Grind reaction mixture 2 for a residence time of 3 minutes.
11. Turn the screw speed to zero and remove reaction product 2 from the CW BRABENDER mixer while the mixer is still hot.
12. Place reaction product 2 into a clean and dry vessel.
13. Clean the CW BRABENDER mixer of all excess material and reset the CW BRABENDER mixer screw speed to 100 rpms.
14. Feed 25 g of reaction product 1 and reaction product 2 directly into the CW BRABENDER mixer.
15. Let the mixture grind for a residence time of 3 minutes.
16. Turn the screw speed to zero and remove reaction product 3 from the CW BRABENDER mixer while the mixer is still hot.
17. Place reaction product 3 into a clean and dry vessel.

Experiment 1—10% Molar Fraction

Reaction Mixture 1
- 40 g nylon
- 0.06 g heat stabilizing agent
- 6 g 2-chloro-N,N-dimethylethylamine hydrochloride
- 2 g calcium carbonate Reaction Mixture 2
- 40 g nylon
- 0.06 g heat stabilizing agent
- 1.5 g calcium hydroxide

Experiment 2—15% Molar Fraction

Reaction Mixture 1
- 40 g nylon
- 0.06 g heat stabilizing agent
- 9 g 2-chloro-N,N-dimethylethylamine hydrochloride
- 3 g calcium carbonate Reaction Mixture 2
- 40 g nylon
- 0.06 g heat stabilizing agent
- 2.25 g calcium hydroxide

Experiment 3—25% Molar Fraction

Reaction Mixture 1
- 30 g nylon
- 0.06 g heat stabilizing agent
- 11 g 2-chloro-N,N-dimethylethylamine hydrochloride
- 3.8 g calcium carbonate Reaction Mixture 2
- 40 g nylon
- 0.06 g heat stabilizing agent
- 3.75 g calcium hydroxide Experiment 4—35% Molar Fraction Reaction Mixture 1
- 30 g nylon
- 0.06 g heat stabilizing agent
- 15.4 g 2-chloro-N,N-dimethylethylamine hydrochloride
- 5.32 g calcium carbonate Reaction Mixture 2
- 40 g nylon
- 0.06 g heat stabilizing agent
- 5.25 g calcium hydroxide Experiment 5—45% Molar Fraction Reaction Mixture 1
- 30 g nylon
- 0.06 g heat stabilizing agent
- 19.8 g 2-chloro-N,N-dimethylethylamine hydrochloride
- 6.84 g calcium carbonate Reaction Mixture 2
- 40 g nylon
- 0.06 g heat stabilizing agent
- 6.75 g calcium hydroxide Experiment 6—50% Molar Fraction Reaction Mixture 1
- 30 g nylon
- 0.06 g heat stabilizing agent
- 22 g 2-chloro-N,N-dimethylethylamine hydrochloride
- 7.6 g calcium carbonate Reaction Mixture 2
- 40 g nylon
- 0.06 g heat stabilizing agent
- 7.5 g calcium hydroxide Experiment 7—Neutralization Test Procedure:
1. Calibrate the pH meter for pH 4 and PH 7.
2. Prepare pH 2 HCl solution.
3. Pour 20 ml of pH 2 HCL solution into 150 ml Erlenmeyer flask.
4. Record pH.
5. Add 10 g of the final product from Experiment 1 into the Erlenmeyer flask.
6. Stir thoroughly with the stir rod for about 1-2 minutes.
7. Record pH.
8. Repeat steps 1-7 with each of the final products from Experiment 2 to 6

Experimental results of Experiment 7 are displayed in FIG. 3 and Table 1 below which shows the relationship between molar fraction and acid neutralization.

TABLE 1

| Molar Fraction | Beginning pH | End pH | weight (g) | $H^+$ |
|---|---|---|---|---|
| 10% | 0.95 | 0.98 | 10.75 | 0.0074 |
| 15% | 0.92 | 1 | 10.86 | 0.0202 |
| 25% | 0.95 | 1.03 | 10.08 | 0.0189 |
| 35% | 0.98 | 1.1 | 10.38 | 0.0253 |
| 45% | 1.02 | 1.16 | 10.64 | 0.0263 |
| 50% | 1.05 | 1.26 | 10.61 | 0.0342 |

Figure 3:
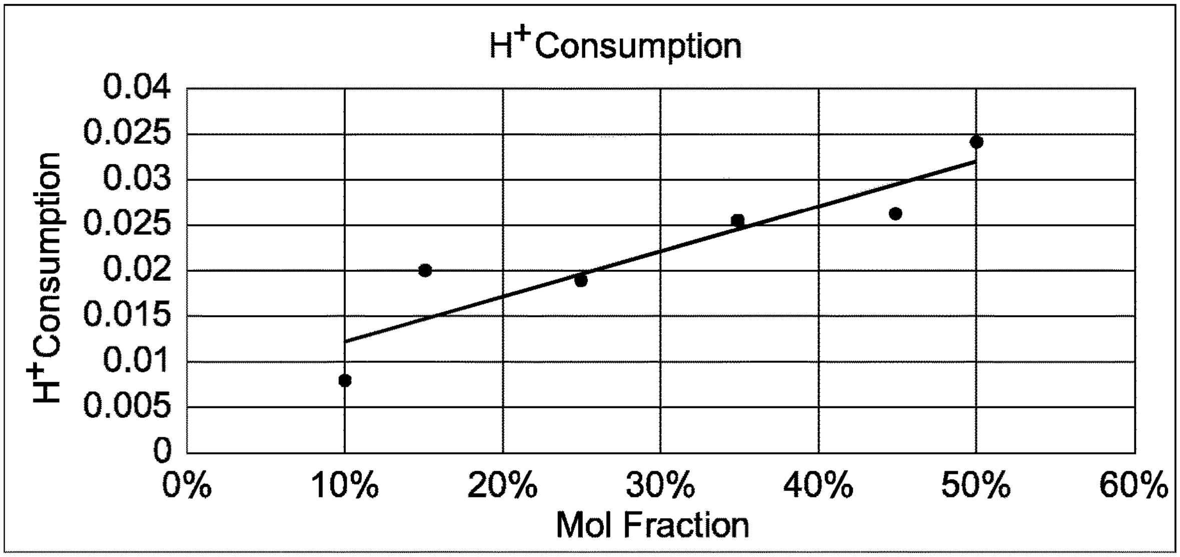
FIG. 3 is a graph of Table 1 showing the relationship between molar fraction and acid neutralization.

As can be seen in FIG. 3 and Table 1, as molar fraction increases, the acid neutralization also increases. As a result, 50% molar fraction was determined to be optimal.

The laboratory scale results form the basis of the process parameters for a scaled-up melt compounding process. For example, in the case of a twin-screw compounding extruder, the reaction information can be directly transferred, and the parameters of temperature, rpm and residence time form the basis of a Design of Experiments (DOE) approach. These variables are evaluated over a range of values according to a classic DOE experimental plan. A similar approach can be taken for the other melt compounding processes discussed earlier.

By way of example, in the specific case of a co-rotating twin-screw compounding extruder, a suitable machine would be one having a screw with a length to diameter (L:D) ratio in the range 40:1 to 75:1. The outputs of machines of this type are dependent on the screw diameter but can be in the range 25 lbs per hour up to 4000 lbs per hour for very large machines. At a full manufacturing scale, it is important to manage off gassing and cooling of the product. As aforementioned, water, buffer, or air cooling may be used. As product exits the die of the extruder, the product may be cooled using a pH 10 buffer bath, water, or air. The cooled product may then be sent to a pelletizer or directly into a pulverizer to create a powder. Additionally, more than one vent and/or filter may be required to control the quantity of carbon dioxide and water vapor that is produced as a byproduct during Reactions 1-3. This may be managed, however, through proper ventilation and filters.

In a further aspect of the present invention, additional acid neutralizing polymer materials may be prepared through the use of alternative amine starting reagents. In one specific example, one alternative amine may be a haloalkyl heterocyclic aromatic amine such as 4-(Chloromethyl)pyridine hydrochloride. 4-(Chloromethyl)pyridine hydrochloride may be a suitable reactant because its chain length is similar to that of many nylon monomers, such as nylon 6, nylon 6,6 or nylon 12. Additional alternative amine compounds may include halogenated tertiary amines, such as and without limitation thereto, 4-(Dimethylamino)benzoyl chloride hydrochloride, 2-Dimethylaminoisopropyl chloride hydrochloride, 2-(Diethylamino)ethyl chloride hydrochloride and 6-Chloro-N,N-dipropylhexan-1-amine.

As generally shown in Reaction 4, the amide/nylon is modified through base-induced removal of the amido hydrogen to generate a reactive nitrogen atom within the polyamide backbone.

Reaction 4

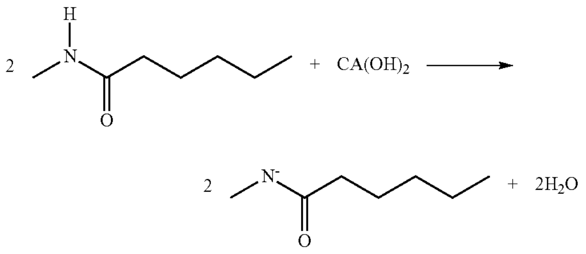

In Reaction 5, the amine salt, e.g., 4-(Chloromethyl)pyridine hydrochloride is neutralized by addition of a buffering agent, such as calcium carbonate, to yield the neutralized 4-(Chloromethyl)pyridine.

Reaction 5

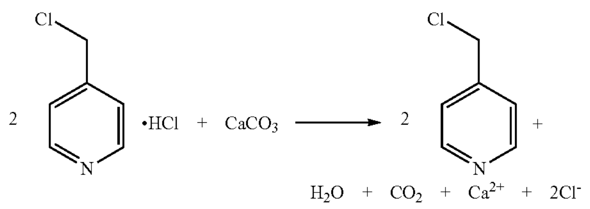

Finally, in Reaction 6, the neutralized 4-(Chloromethyl) pyridine then reacts with the reactive nitrogen atom on the polyamide backbone to form the acid neutralizing polymer material end product.

Reaction 6

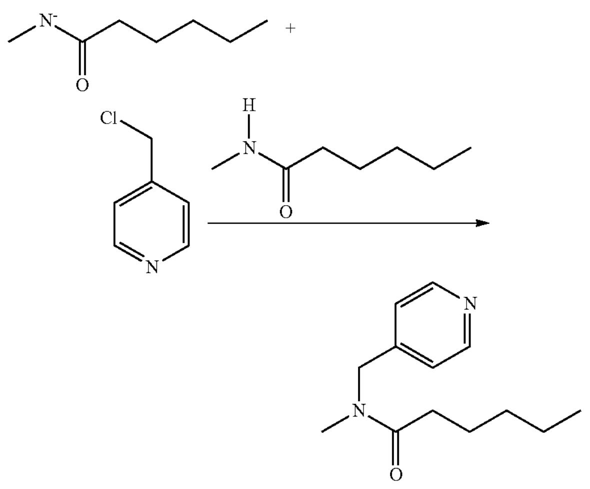

Figure 4:
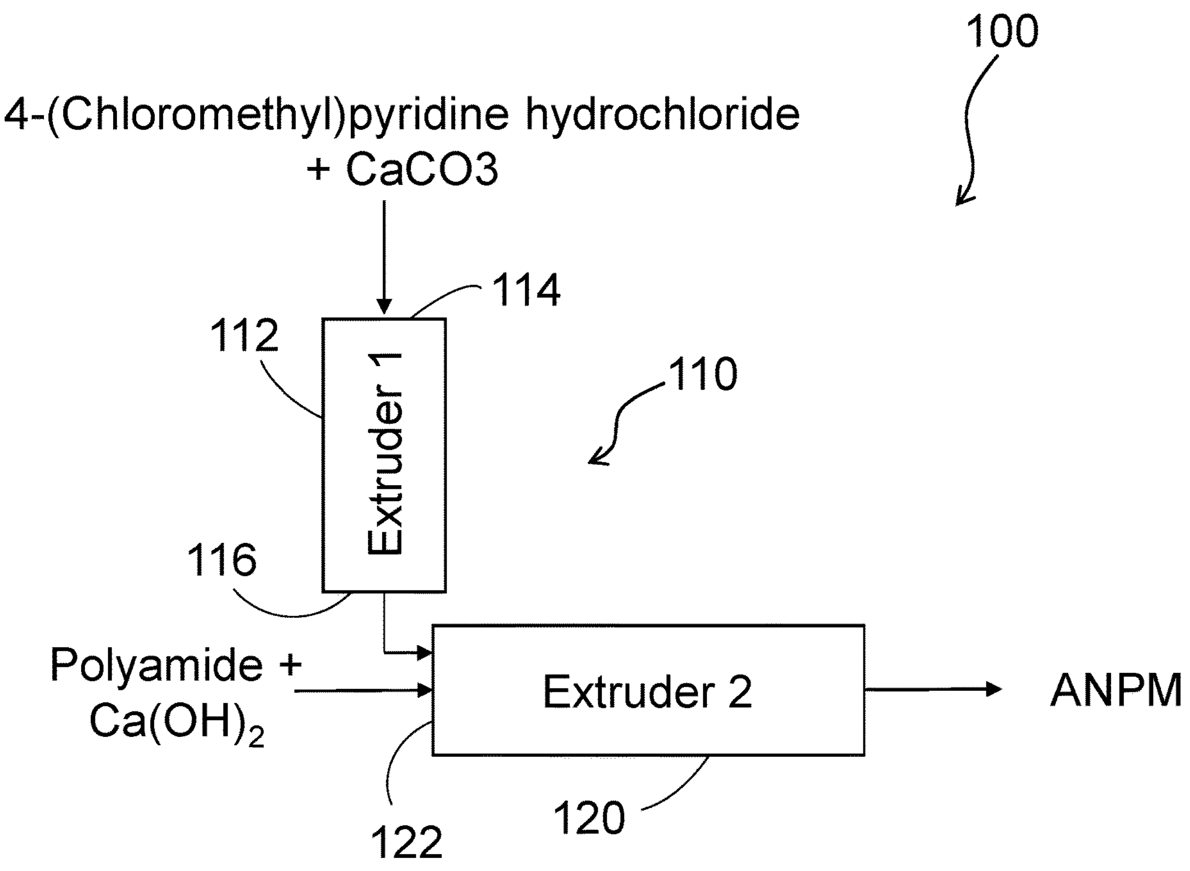
FIG. 4 is a schematic of another alternative exemplary system for producing acid neutralizing polyamide in accordance with the present invention.

In another aspect of the invention, alternative manufacturing systems and processes were developed to produce the exemplary alternative embodiment of the acid neutralizing polymer material. With reference to FIG. 4, a first manufacturing system and process 100 may include a tandem extruder assembly 110 which may be used to conduct two manufacturing steps in parallel. As shown in FIG. 4, first extruder 112 is configured to receive a halogenated tertiary amine or haloalkyl heterocyclic aromatic amine, such as 4-(Chloromethyl)pyridine hydrochloride, and the buffering agent, such as calcium carbonate, at a first end 114. The 4-(Chloromethyl)pyridine hydrochloride is neutralized by the buffering agent as the materials traverse the length of extruder 112 before exiting extruder 112 at second end 116 (see, e.g., Reaction 5).

Second end 116 of first extruded 112 may be aligned with first end 122 of a second extruder 120 whereby the neutralized polyamide may be fed directly into second extruder 120, along with the polyamide (e.g., nylon 6, nylon 6,6 or nylon 12) and a strong base (e.g., $Ca(OH)_2$). As the loaded materials travel the length of second extruder 120, the amido nitrogen is removed from the polyamide to generate a reactive nitrogen site which may then react with the neutralized amine (e.g., 4-(Chloromethyl)pyridine) to form the acid neutralizing polymer material. As a result, tandem extruder manufacturing system and process 100 may improve efficiencies while also reducing costs and production time.

Figure 5:
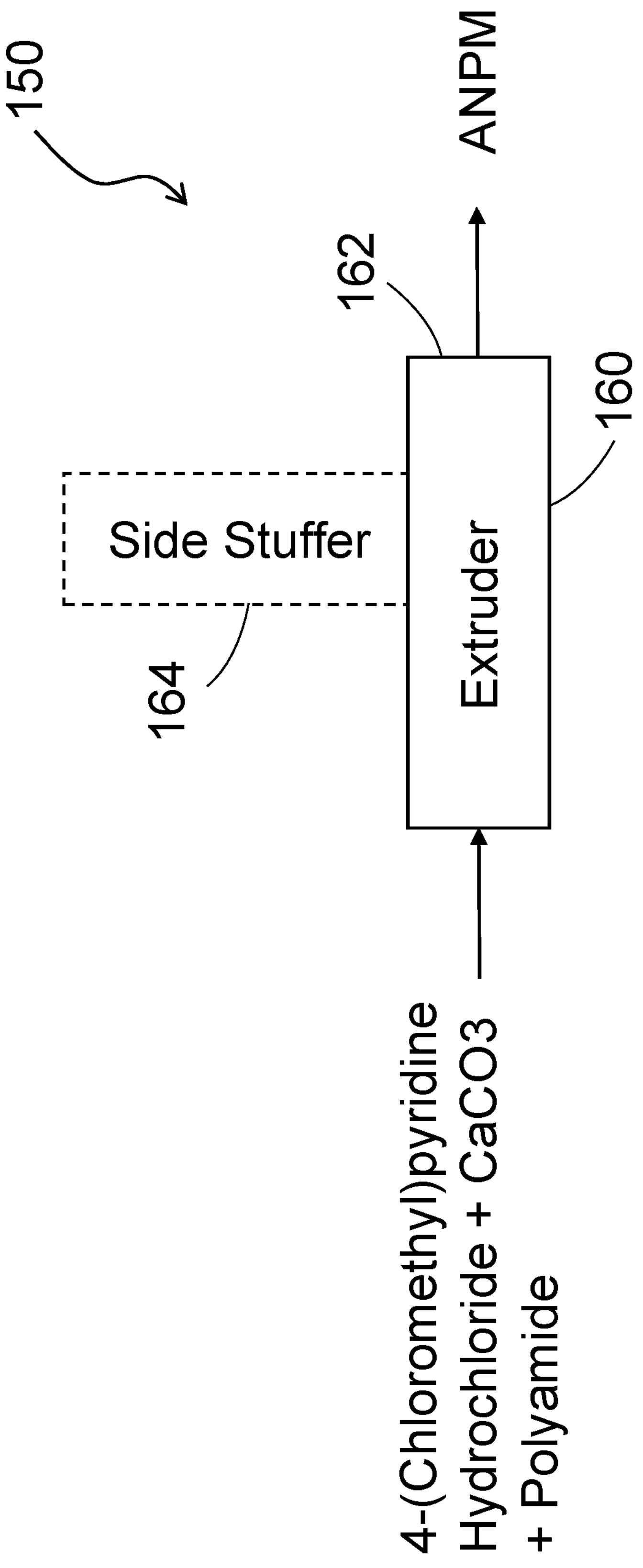
FIG. 5 is a schematic a further alternative exemplary system for producing acid neutralizing polyamide in accordance with the present invention.

Turning now to FIG. 5, an alternative single extruder manufacturing system and process 150 may be used in the production of the acid neutralizing polymer material. As shown in FIG. 5, an amine, e.g., 4-(Chloromethyl)pyridine hydrochloride, a polyamide, such as nylon 6, nylon 6,6 or nylon 12, and a buffering agent, such as calcium carbonate or sodium bicarbonate, are all added to extruder 160. Without being limited to any one particular theory, the buffering agent may be used to neutralize the hydrochloride salt of the amine. The amine group of the neutralized 4-(Chloromethyl) pyridine may then act as a base to deprotonate the amido hydrogen on the nylon backbone. The 4-(Chloromethyl) pyridine may then further graft to the nylon backbone through a substitution reaction to form a protonated acid neutralizing polymer material. See Reaction 7, below.

Reaction 7

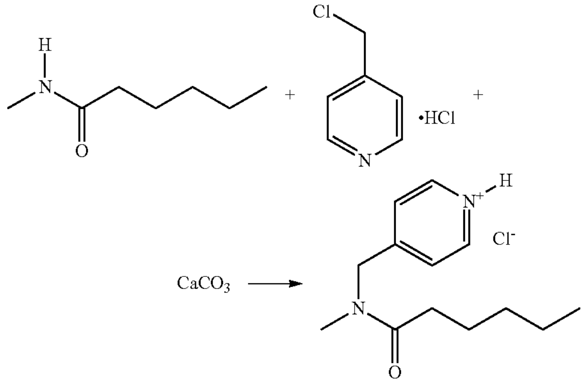

Towards the output end 162 of the extruder 160, a neutralizing agent (e.g., calcium carbonate or sodium bicarbonate) may be side-stuffed into extruder 160, such as via an optional side stuffer 164. The neutralizing agent may then deprotonate the protonated amine within the acid neutralizing polymer material to generate the final acid neutralizing polymer material product. Alternatively, a molar excess of buffering agent may be initially added to extruder 160 whereby this excess buffering agent may neutralize the protonated amine of the acid neutralizing polymer material as it is being produced.

This side extruder production system and process leads to much better economics as well as efficiency from raw material to product. It should be noted that a longer extruder may be needed to ensure adequate mixing time to complete the reactions necessary to produce that acid neutralizing polymer material. An optional side stuffer may also be required to activate the neutralization function of the polymer material. These manufacturing processes and the resultant amine polymer product may exceed previous literature by taking advantage of a more efficient reactive extrusion process, as well as removing toxicity implicated by heretofore employed amines.

The reactive amine of the acid neutralizing polymer material is also highly reactive to acids which can cause corrosion and can lead to devastating injury during a spill or other release of the acid. In accordance with an aspect of the present invention, the acid neutralizing polymer material can be made into fabric or mesh or can also be pelletized to be mixed with other polymers. The pellets can also be further ground into powder to be used as an additive in coatings and other building materials such as mortar and polymer concrete in order to impart acid neutralization functionality.

From the above, it should be noted that each of the reactions may take place at any desired temperature, but preferably below the boiling point of the respective materials. Additionally, each reaction may also occur at any desired pressure within the compounding machine. Reaction times will thus depend upon the flow rate of the compounding machine, and the temperature and pressure of each reaction within the compounding machine.

Although the invention has been described with reference to preferred embodiments thereof, it is understood that various modifications may be made thereto without departing from the full spirit and scope of the invention as defined by the claims which follow.

What is claimed is:

1. A method of making an acid neutralizing polymer material, comprising:
- preparing a first reaction mixture comprising:
  - a) a buffering agent; and
  - b) an amine salt of either:
    - i) a halogenated tertiary amine having a general chemical formula:

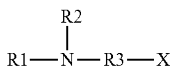

wherein R1 and R2 are an alkyl containing 1-4 carbon atoms, R3 is a 1-12 carbon alkyl, aryl, heteroaryl or cycloalkyl and X is either chlorine or bromine, or
    - ii) a haloalkyl heterocyclic aromatic amine wherein the halogen is either chlorine or bromine;
- adding the first reaction mixture to a first compounding machine;
- reacting the first reaction mixture for a time and at a temperature sufficient to produce a first reaction product comprising a neutralized amine;
- preparing a second reaction mixture comprising a polyamide material and a strong base;
- adding the first reaction product and the second reaction mixture to a second compounding machine;
- reacting the first reaction product and the second reaction mixture for a time and at a temperature sufficient to produce the acid neutralizing polymer material.

2. The method of claim 1 further comprising cooling the acid neutralizing polymer material in a cooling machine.

3. The method of claim 2 further comprising reducing a particle size of the acid neutralizing polymer material in a size reduction machine.

4. The method of claim 1 wherein one or both of the first reaction mixture and the second reaction mixture further comprise a heat stabilizing agent.

5. The method of claim 2 wherein the cooling machine comprises a pH 10 basic buffer solution bath.

6. The method of claim 1 wherein the polyamide material comprises nylon 6, nylon 6,6 or nylon 12.

7. The method of claim 1 wherein the strongly basic material is potassium tert-butoxide (KOtBu) or calcium hydroxide ($Ca(OH_2)$).

8. The method of claim 1 wherein the halogenated tertiary amine is selected from the list consisting of 4-(Dimethylamino)benzoyl chloride hydrochloride, 2-Dimethylaminoisopropyl chloride hydrochloride, 2-(Diethylamino)ethyl chloride hydrochloride and 6-Chloro-N,N-dipropylhexan-1-amine, or the haloalkyl heterocyclic aromatic amine is 4-(Chloromethyl)pyridine hydrochloride.

9. The method of claim 1 wherein the compounding machines each comprise one or more twin screw extruders.

10. The method of claim 1 wherein the temperature of the first and second compounding machines is between about 194 degrees Celsius and about 205 degrees Celsius.

11. The method of claim 3 wherein the acid neutralizing polymer material is sized reduced by pelletizing to a mean particle size of between about 2 and about 8 millimeters.

12. The method of claim 11 wherein the acid neutralizing polymer material is sized reduced through one or more of the steps of:
- forming the acid neutralizing polymer material into fibers for weaving into fabric material;
- pelletizing the acid neutralizing polymer material for mixing with other polymers; or
- pulverizing the acid neutralizing polymer material into a powder.

13. The method of claim 12 wherein the sized reduced acid neutralizing polymer material is incorporated with a floor mat.

14. A method of making an acid neutralizing polymer material, comprising:
- preparing a first reaction mixture comprising:
  - a) a buffering agent; and
  - b) an amine salt of either:
    - i) a halogenated tertiary amine having a general chemical formula:

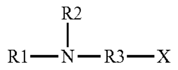

wherein R1 and R2 are an alkyl containing 1-4 carbon atoms, R3 is a 1-12 carbon alkyl, aryl, heteroaryl or cycloalkyl and X is either chlorine or bromine, or
    - ii) a haloalkyl heterocyclic aromatic amine wherein the halogen is either chlorine or bromine; and c) a polyamide material;
- adding the reaction mixture to a compounding machine; and
- reacting the reaction mixture for a time and at a temperature sufficient to produce the acid neutralizing polymer material.

15. The method of claim 14 wherein the compounding machine comprises a twin screw extruder.

16. The method of claim 14 wherein the twin screw extruder further includes a side stuffer.

17. The method of claim 16 further comprising adding a neutralizing agent to the compounding machine through the side stuffer.

* * * * *